United States Patent
Zybin

(10) Patent No.: US 6,195,036 B1
(45) Date of Patent: Feb. 27, 2001

(54) PULSE RADIO-LOCALIZATION SYSTEM

(76) Inventor: Mikhail Nikolaevich Zybin, Russian Federation, 103062, Moscow, ul. Pokrovka, d. 33/22, kv. 7 (RU)

(*) Notice: Subject to any disclaimer, the term of this patent is extended or adjusted under 35 U.S.C. 154(b) by 0 days.

(21) Appl. No.: 09/284,439

(22) PCT Filed: Jul. 11, 1997

(86) PCT No.: PCT/RU97/00220

§ 371 Date: Apr. 14, 1999

§ 102(e) Date: Apr. 14, 1999

(87) PCT Pub. No.: WO98/16845

PCT Pub. Date: Apr. 23, 1998

(30) Foreign Application Priority Data

Oct. 15, 1996 (RU) .................................................. 9612661

(51) Int. Cl.[7] ...................................................... G01S 7/28
(52) U.S. Cl. ........................ 342/202; 342/128; 342/130; 342/131; 342/132; 342/134; 342/175; 342/200; 342/201
(58) Field of Search ........................... 342/118, 128–132, 342/134, 175, 200–204

(56) References Cited

U.S. PATENT DOCUMENTS

| | | |
|---|---|---|
| 3,996,588 | 12/1976 | Besson et al. . |
| 4,001,825 | 1/1977 | Burgers . |
| 4,071,844 | 1/1978 | Hopwood et al. . |
| 4,330,760 | 5/1982 | Busacca et al. . |
| 4,682,178 * | 7/1987 | Anflo et al. ........................... 342/202 |

FOREIGN PATENT DOCUMENTS

1820346 A1   6/1993  (SU) .

OTHER PUBLICATIONS

Data Sheet, Pulsed Magnetron X–band (YJ 1172), Philips, pp. 22 and 24, No Date.
Application Note, Frequency Agility Packages, Philips, pp. 118, 121–123, No Date.

* cited by examiner

Primary Examiner—Bernarr E. Gregory
(74) Attorney, Agent, or Firm—Hardaway/Mann IP Group Nexsen Pruet Jacobs & Pollard, LLP

(57) ABSTRACT

A pulse radar system includes a frequency-agile magnetron comprising an input for giving a feeding voltage of a magnetron tuner. A modulator connected to said magnetron forms pulses of a feeding voltage for the magnetron. A low power signal source also connected to said magnetron generates microwave frequency signals which are given to the magnetron in pauses between pulses. These signals have the frequencies differing from the frequencies of the signals generated by the magnetron and fixed during each period of magnetron pulse repetition. This radar system also includes a signal converter receiving the low power signals reflected by the magnetron. These signals are converted into the signals connected in time to the moments, when the frequencies of the low power source and the frequencies of the magnetron oscillating system coincide with each other. Further, said signals are used for triggering the modulator connected to said converter. In other embodiments, the pulse radar system comprises a receiver connected to a receiving antenna as well as to said low power microwave signal source.

4 Claims, 2 Drawing Sheets

PULSE RADIO-LOCALIZATION SYSTEM

BACKGROUND OF THE INVENTION

The invention relates to a pulse radio technique and, more concretely, to radar system designs and the one can be used in radar system of aviation, sea and river transport, other transport means, as well as for mapping earth surface, meteorological, ecological and other researchs of atmosphere, and other aims. It is the most perspective to use this invention in ground apparatus of small and middle sized aerodromes and navigation apparatus of aircrafts. These navigation apparatus can be designed for operating at fires, mountains, fog or low clouds.

It is known pulse radar systems created on the basis of frequency-agile magnetrons and using a tracking of a resonant frequency of magnetron oscillating system ("cold frequency" of magnetron) during a pause between pulses. For example, the radar system constructed on the basis of the magnetron YJ 1172 Philips Corporation (prospects "Pulsed Magnetron X-band YJ 1172" or "Frequency Agility Packages") comprises said frequency-agile magnetron receiving a signal from a low power source (a local oscillator) tuned by a varactor scheme. During a pause between pulses, a tracking of magnetron frequency is fulfilled by laying a signal, frequency 4 MHz, on the tuning voltage of said low power source and measuring a phase of resulted signal coming from a tracking detector after its reflection by the magnetron.

A coarse tuning of a frequency of the local oscillator has been begun by a synchronizing pulse about 1 µs before the magnetron generates its pulse. A precise tuning of a frequency of that oscillator is being fulfilled in the process of generating the magnetron pulse.

That construction of the radar system permits to set a local oscillator at the frequency providing an intermediate frequency of a receiver rather precise, if the intermediate frequency of the receiver is nearby to the difference between "cold frequency" of the magnetron in the pause between pulses and the frequency of the signal, generated by the magnetron.

However, that construction does not provide operation of the radar system for predetermined frequencies of any pulse, especially for high destabilizing factors and changes of tuning frequency rate in the operation process. This conducts to a limitation of information from the radar system, a decrease of its frequency agility and a reduction of the reliability of the radar system.

Besides that, a necessity of fast tuning of frequency during a pause between pulses does not permit to use the most stable, fixed local oscillators. The system of tuning of frequency with an use of the additional source of the signal, frequency 4 MHz, and the measuring of a phase of the resulted signal after a tracking detector make the construction of the radar system much more complicated and its operation less reliable because of additional possible defects in the system of tracking and tuning.

An essential defect of that construction is also impossible to realize operation at one or a few frequencies fixed with high accuracy, if a vibration and other destabilizing factors influence changing a magnetron frequency.

This decreases the universality and the reliability of that radar system in addition.

SUMMARY OF THE INVENTION

An aim of this invention is to increase the quantity of information and the reliability of the radar system so as to receive the possibility of fast conversion (during one period of magnetron pulse repetition) from operation with the frequency turning from pulse to pulse to operation at one or a few fixed frequencies and back.

Said aim is provided by using a radar system comprising a magnetron, an input for giving a feeding voltage of a magnetron tunner, a modulator connected to the magnetron and forming pulses of a feeding voltage for the magnetron, a low power microwave signal source connected to the magnetron and giving its signal to the magnetron in pauses between pulses, and differing from the nearest known designs by that said low power microwave signal source has frequencies fixed during each period of magnetron pulse repetition and differing from frequencies of correspondent signals generated by the magnetron, and that the radar system comprises a signal converter which can receive said low power signals reflected by the magnetron and convert these signals into the signals connected in time to the moments, when the frequencies of said low power source and the oscillating system of the magnetron coincide with each other, and used for triggering the modulator connected to said signal converter.

Another embodiment of that pulse radar system designed in addition for a reception of the signal reflected from target also includes a receiver designed for processing these signals and an antenna connected to the receiver and receiving said signals.

Next embodiment of said radar system designed for both a radiation and a reception of the signal differs from previous by that the receiver is connected to said low power microwave signal source to transfer synchronizing signals to said source for switching its frequencies.

Further embodiment differs from two previous by that the receiver is connected in addition to said low power microwave signal source, which, in this case, is also a local oscillator of the receiver and gives its signals to the receiver.

It is also possible other present radar system embodiments, which allow to resolve a problem of increase of information and reliability of radar systems.

The offered shift of structure of radar system provides essential advantages of that system to the nearest known design, for example:

The radar system radiates the signal of the predetermined frequency, which may be an independent source of information.

The radiated frequency is conditioned only the frequency of the low power microwave signal source and may be shifted easily from pause to pause between pulses by an arbitrary, for example, random law or, in case of need, may be kept up constant.

The radiated frequency does not depend on destabilizing factors, shifts of a tuning rate, and a transition to a work at the fixed frequency and back. That increases the information and the reliability of the present radar system thanks to a use of the exact predetermined frequency as an additional source of the information and a considerable increase of the reliability of the radar system by means of fast transition from one regime of operation to another.

It is possible very simple way, for instance, by shifting a feeding voltage of the tuner of the magnetron, that is by shifting a rate of tuning, at the same time, to shift the disposition of pulses. That increases the quantity of the information and the reliability of the radar system in addition.

DESCRIPTION OF THE PREFERRED EMBODIMENTS

It is possible many embodiments of the present invention. Let us consider some of them.

Figure 1:
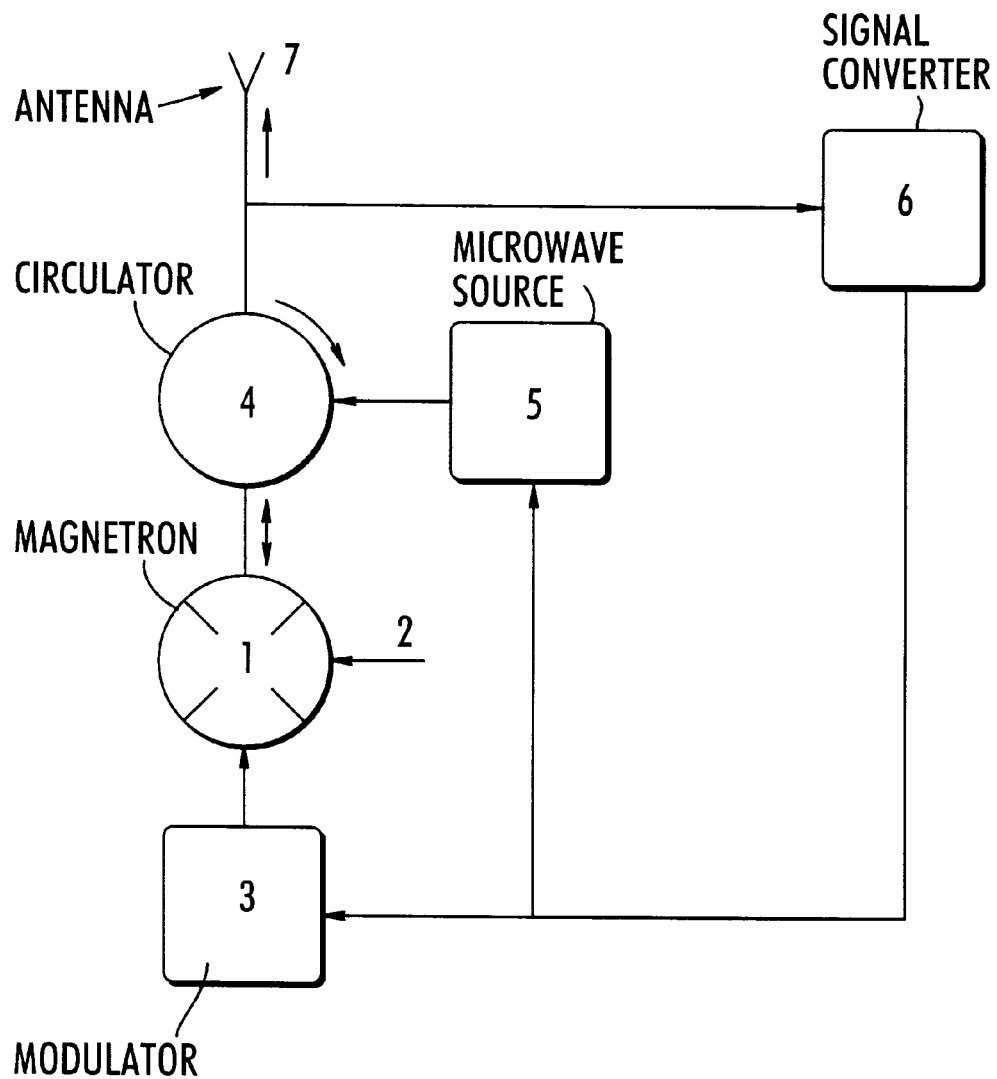
FIG. 1 shows a block diagram of the present radar system for one of possible embodiments designed only for a radiation of signals.

The radar system shown in FIG. 1 and designed only for a radiation of the signal comprises: a tuned magnetron 1, an input 2 for giving a feeding voltage of a magnetron tuner, a modulator 3 connected to the magnetron and forming pulses of a feeding voltage for the magnetron, a circular 4 connecting the magnetron 1 and a low power microwave signal source 5 giving its signals to the magnetron in pauses between pulses and having the frequencies fixed during each period of magnetron pulse repetition and differing from frequencies of the correspondent signals generated by the magnetron, a signal converter 6 which can receive said low power signals reflected by the magnetron and convert these signals into the signals connected in time to the moments, when the frequencies of said low power source 5 and the oscillating system of the magnetron 1 coincide with each other, and used for triggering the modulator 3 connected to said signal converter 6.

Besides that, in the present embodiment of the radar system, the converter 6 is connected to the low power source 5 to synchronize a switching of frequencies of the source 5, a triggering of the modulator 3, and, therefore, a radiation of signals of the radar system, and magnetron 1 is connected to the antenna 7 radiating signals of the radar system.

However, it is possible embodiments of the present radar system in which a circulator, an antenna and a connection of the signal converter 6 to the source 5 are absent as far as the source 5 can be connected to the magnetron directly, for example, through an additional input of the magnetron, an antenna can be excluded because the magnetron or one of outputs of the circulator can radiate a signal directly, without an antenna, and a connection of the signal converter 6 to the source 5 can be replace by a successive autonomous switching of frequencies of the source without a synchronization of said signal or by means of a use of other signal, for example, a pulse of the magnetron as the signal of synchronization.

It is possible other embodiments of the present radar system operating only for a radiation.

If we add a receiver of signal reflected from a target with an own receiving antenna to the radar system shown in FIG. 1, we receive the embodiment of the present invention designed for both a radiation and a reception of signals of the radar system.

Figure 2:
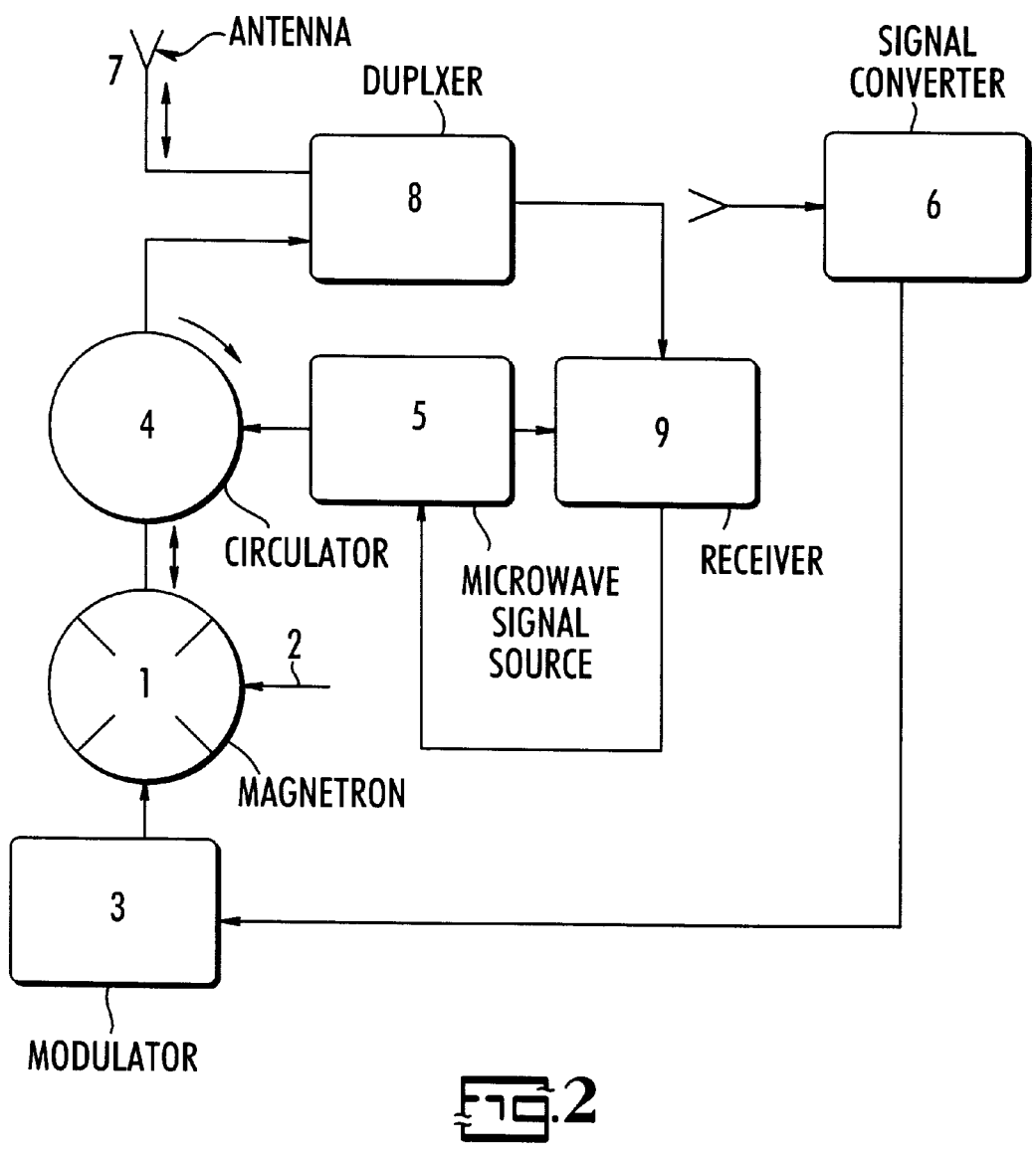
FIG. 2 shows a block diagram of the present radar system for one of possible embodiments designed for both a radiation and a reception of signals.

However, separate antennas for a radiation and reception are employed rather seldom in one radar system, therefore we shall consider the radar system having one antenna for radiation and reception of the signal and shown in FIG. 2 more detail. The radar system comprises: a tuned magnetron 1, an input 2 for giving a feeding voltage of a magnetron tuner, a modulator 3 connected to the magnetron and forming pulses of a feeding voltage for the magnetron, a low power microwave signal source 5 connected to the magnetron and giving its signals to the magnetron through a circular 4 in pauses between pulses, and having the frequencies fixed during each period of magnetron pulse repetition and differing from the frequencies of the correspondent signals generated by the magnetron, a signal converter 6 which can receive said low-power signals reflected from the magnetron 1 and convert these signals into the signals connected in time to the moments, when the frequencies of said low power source 5 and the oscillating system of the magnetron 1 coincide with each other, and used for triggering the modulator 3 connected to said signal converter 6. Besides, that embodiment of the radar system comprises: an antenna 7 to radiate signals and to receive the signals reflected from a target, a duplexer 8 connecting the antenna to a receiver 9 connected twice to the low power source 5. The first connection provides an use of the low-power source 5 as a local oscillator of the receiver. The second connection provides an entrance of the synchronizing signal from the receiver 9 to the source 5 for switching its frequencies. The source 5, in that case, can be placed both in the transmitter and in the receiver of the radar system. At the same time, the magnetron 1 is also connected to the converter 6 through the duplexer 8. It is necessary to say, the connection of the magnetron 1 to the converter 6 must not be fulfilled without fail as an unbroken transmission line. The signal reflected from the magnetron can be received by the converter after a passing of the duplexer as that shown in FIG. 2, by means of the own additional antenna, for example, a megaphone antenna placed near one of the waveguide connection. That allows to simplify the design of the radar system.

It is also necessary to say, we suppose the modulator 3, the low power source 5 and the receiver 9 have own power supplies, however, it is possible other embodiments with united or separate external power supplies of these elements.

Now, let us consider the present embodiments of the radar system in their operation. The operation of the radar system shown in FIG. 1 begins by switching on the modulator 3 and giving a feeding voltage to an input 2 of the magnetron tuner. Then, the low power microwave signal source 5 is switched on and its fixed frequency signal passes to the magnetron through a circulator 4, reflects from the magnetron and passes in the signal converter 6. Then, when the resonant frequency of oscillating system of the magnetron coincides with the frequency of the microwave signal source 5, the signal reflected from the magnetron is decreased its amplitude. This allows to convert the signal reflected from the magnetron to the signal connected in time to the moment, when the frequencies of the low power source 5 and the oscillating system of the magnetron coincide with each other, and to trigger the modulator 3. Receiving the trigger signal, modulator 3 forms the pulse of a feeding voltage of the magnetron 1, which radiates the power microwave frequency signal towards a target through an antenna 7. Simultaneously with triggering the modulator 3, that signal switches, if it is necessary, the frequency of the low power source 5. A new cycle of operation of the radar system begins the coincidence of the frequencies of the oscillating system of the magnetron and the low power source 5.

A frequency of a signal radiated of the radar system does not depend on destabilizing influences and one is conditioned only the frequency of the low power source 5 and a difference of the frequency of the oscillating system of the magnetron and the corresponding frequency generated by the present magnetron. Advantages of the radar system remain for operation at a fixed frequency because the frequency is maintained very stable for any destabilizing influences.

Operation of the radar system designed for a radiation and a reception of the signal and having a signal receiver, which is not connected to the rest of part of the radar system and has an own receiving antenna, repeats the described above operation exactly only with that difference that, after the radiation of the signal by the radar system and its reflection from a target, the signal is received by the receiving antenna and passes in the receiver 9, where it is worked up and results of this processing is given an indicator or may be employed in a different way.

All advantages of the present radar system remain naturally in that case.

Operation of the radar system shown in FIG. 2 and having a common radiating and receiving antenna begins by switching on the modulator 3 and the receiver 9 and giving a feeding voltage to an input 2 of the magnetron tuner, and switching on the low power microwave signal source 5. In that case, the frequency of the oscillating system of the magnetron begins to change by a periodical law, and a fixed frequency signal of the low power source 5 passes through a circulator 4 to the magnetron 1 and reflects from it. The signal reflecting from the magnetron decreases quickly in amplitude because of a change of a resistance of the magnetron at the resonant frequency of its oscillating system.

The signal reflecting from the magnetron and having the frequency predetermined by the source 5 passes through a duplexer 8 to the signal converter, which converts that signal in the signal connected in time to the moment, when the frequencies of the low power source 5 and the magnetron oscillating system coincide with each other, and switching on the modulator 3.

Receiving the triggering signal, the modulator 3 forms the pulse of a voltage for the magnetron 1, which generates the power microwave frequency signal, which arrives at the antenna 7 through the circulator 4 and the duplexer 8.

The pulse microwave frequency signal is radiated by the antenna 7, is reflected by a target and, thus, arrives at the antenna 7 again. The received signal arrives from the antenna 7 to the receiver 9 through the duplexer 8. The received signal is worked up in the receiver 9 and results of processing are given at the indicator or may be employed in a different way. To work up the signal it is used either a local oscillator of the receiver or said low power source 5 as it is shown in FIG. 2. After the processing of the received signal, the receiver 9 gives a synchronizing signal at the low power source 5 for switching its frequency. A new cycle of operation of the radar system begins after switching a frequency of the source 5 and coinciding its frequency and the frequency of the magnetron oscillating system.

Of course, the present invention may be realized by means of a lot of other embodiments, which were not considered above, for example, by means of variations of unessential features adduced in the present constructions.

What is claimed is:

1. A pulse radar system comprising:
  (a) a tuned magnetron;
  (b) an input feeding voltage to said tuned magnetron;
  (c) a modulator connected to said magnetron for pulsing a feeding voltage to said magnetron;
  (d) a circulator connected to said tuned magnetron;
  (e) a low power microwave signal source radiating signals of frequencies fixed during each period of magnetron pulse repetition and differing from frequencies of correspondent signals generated by said magnetron and said source connected to said magnetron through said circulator to send signals to said magnetron in pauses between pulses of said magnetron;
  (f) a signal converter connected to said modulator, to said circulator and to said microwave signal source to receive signals from said low power microwave signal source after said signals are reflected by said magnetron and to convert said signals into signals connected in time to moments in which frequencies of said low power source and an oscillating frequency of said magnetron coincide, and to trigger said modulator.

2. A pulse radar system according to claim 1 further comprising an antenna to radiate and receive signals, a duplexer and receiver.

3. A pulse radar system according to claim 2 wherein said receiver is connected to said low power microwave signal source to transfer synchronizing signals to said source for switching frequencies of said source.

4. A pulse radar system according to claim 2 wherein said receiver is connected to said low power microwave signal source which sends signals to said receiver.

* * * * *